US012569952B2

(12) United States Patent
Shasha, II et al.

(10) Patent No.: US 12,569,952 B2
(45) Date of Patent: Mar. 10, 2026

(54) POWER SAVING SHUTOFF GATE FOR A PNEUMATIC SCRAP CONVEYING SYSTEM

(71) Applicant: Power Flow Unlimited, LLC, Paramount, CA (US)

(72) Inventors: Joseph Anthony Shasha, II, Los Alamitos, CA (US); Jeffrey James Branson, Seal Beach, CA (US); Nathan Daniel Black, Long Beach, CA (US)

(73) Assignee: Power Flow Unlimited, LLC, Paramount, CA (US)

( * ) Notice: Subject to any disclaimer, the term of this patent is extended or adjusted under 35 U.S.C. 154(b) by 84 days.

(21) Appl. No.: 18/757,146

(22) Filed: Jun. 27, 2024

(65) Prior Publication Data

US 2025/0001537 A1    Jan. 2, 2025

Related U.S. Application Data

(60) Provisional application No. 63/511,369, filed on Jun. 30, 2023.

(51) Int. Cl.
B23Q 11/00 (2006.01)
A47L 5/38 (2006.01)

(52) U.S. Cl.
CPC ............ B23Q 11/0046 (2013.01); A47L 5/38 (2013.01)

(58) Field of Classification Search
CPC .............................. B23Q 11/0046; A47L 5/38
USPC .......................................................... 198/463
See application file for complete search history.

(56) References Cited

U.S. PATENT DOCUMENTS

| | | | | |
|---|---|---|---|---|
| 2,939,933 | A | * 6/1960 | Manganaro | ............ H01H 61/02 |
| | | | | 337/123 |
| 5,379,668 | A | 1/1995 | Standing | |
| 5,606,767 | A | 3/1997 | Crlenjak et al. | |
| 6,012,199 | A | 1/2000 | Litomisky et al. | |
| 6,182,326 | B1 | 2/2001 | Rhea et al. | |
| 7,146,677 | B2 | 12/2006 | Litomisky et al. | |
| 7,329,329 | B2 | * 2/2008 | Masemore | .............. C10B 47/44 |
| | | | | 202/117 |

(Continued)

FOREIGN PATENT DOCUMENTS

| | | | |
|---|---|---|---|
| CN | 202203428 | * | 4/2012 |
| CN | 218636872 | U | 3/2023 |

(Continued)

*Primary Examiner* — Gene O Crawford
*Assistant Examiner* — Lester Rushin, III
(74) *Attorney, Agent, or Firm* — Knobbe Martens Olson & Bear LLP

(57)    ABSTRACT

A pneumatic scrap conveying system can include a plurality of vacuums coupled to a scrap removal area. A pneumatic scrap conveying system can also include a plurality of ducts each coupled to the plurality of vacuums. The pneumatic scrap conveying system can also include a plurality of gates positioned adjacent to the plurality of ducts and designed to open and close. Additionally, the plurality of vacuums can be configured to remove scrap from the manufacturing lines by suctioning scrap located through the plurality of gates when the gates are in an open position to the scrap removal area. Furthermore, the plurality of gates can reduce a volume of air received by the plurality of vacuums when one of the gates is closed, which can reduce the amount of energy consumed by at least one of the plurality of vacuums.

17 Claims, 12 Drawing Sheets

(56)                    References Cited

U.S. PATENT DOCUMENTS

| | | | |
|---|---|---|---|
| 9,657,958 | B2 | 5/2017 | Litomisky et al. |
| 9,914,190 | B2 | 3/2018 | Hartness |
| 10,265,741 | B1 | 4/2019 | Kelyman |
| 10,634,377 | B2 | 4/2020 | Litomisky |
| 11,478,948 | B2 | 10/2022 | Adami |
| 11,844,488 | B2 * | 12/2023 | Fitzsimmons .......... A47L 9/248 |
| 2010/0199453 | A1 | 8/2010 | Brotto et al. |
| 2012/0321395 | A1 * | 12/2012 | Alfrost ................... B65F 5/005 406/32 |
| 2015/0321843 | A1 * | 11/2015 | Forestier ............... B65G 53/66 406/30 |
| 2020/0217541 | A1 | 7/2020 | Litomisky et al. |

FOREIGN PATENT DOCUMENTS

| | | | |
|---|---|---|---|
| EP | 2542484 | * | 9/2024 |
| GB | 2312494 | * | 10/1997 |
| NO | 305923 | * | 8/1999 |

\* cited by examiner

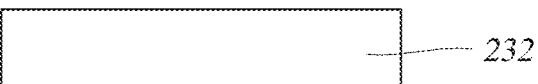
*FIG. 4C*
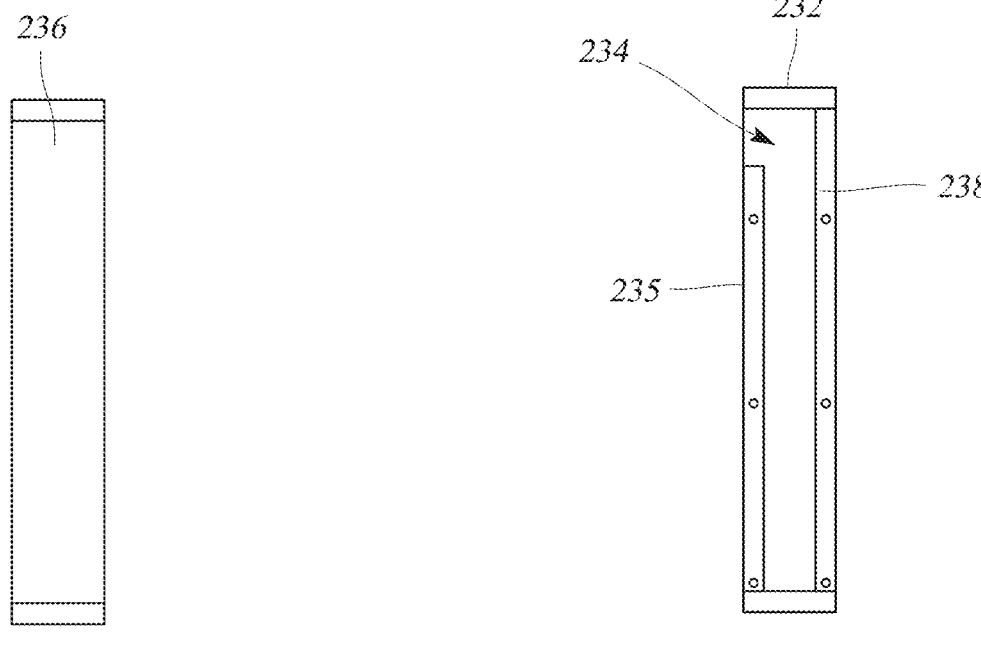
*FIG. 4D*            *FIG. 4E*

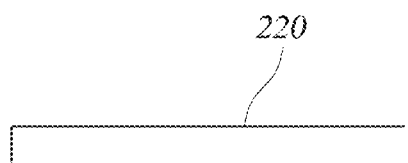
*FIG. 5A*
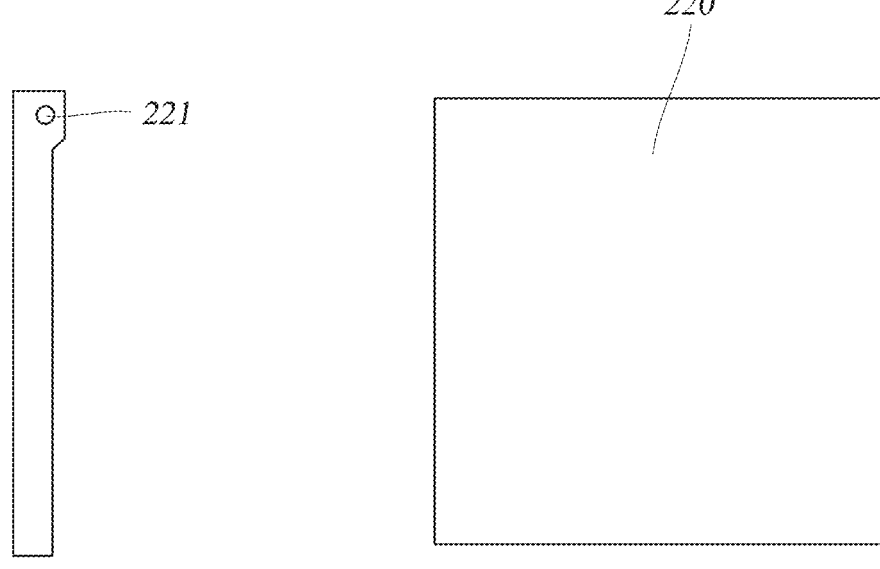
*FIG. 5B*          *FIG. 5C*

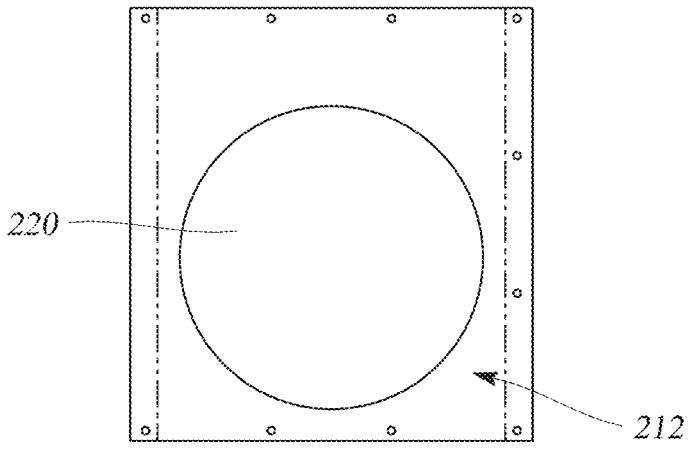
220
212
*FIG. 6A*
216
210
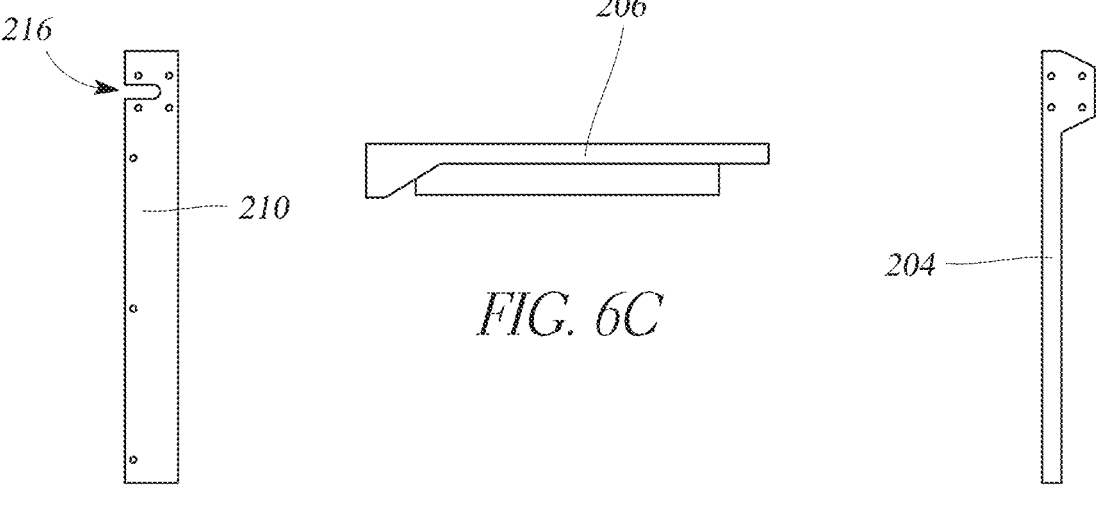
206
*FIG. 6C*
204
*FIG. 6B*
*FIG. 6D*

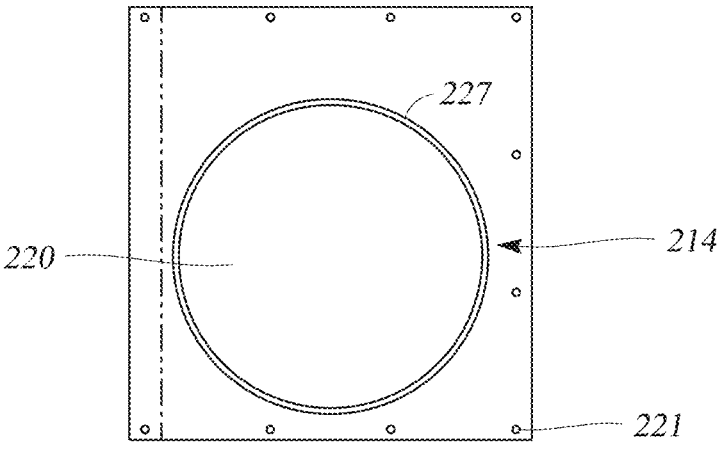
*FIG. 8A*
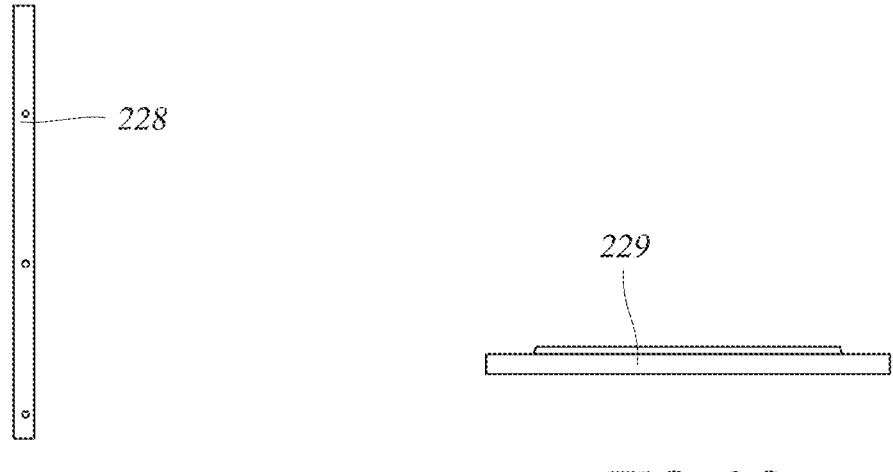
*FIG. 8C*
*FIG. 8B*

245    244

247    244

POWER SAVING SHUTOFF GATE FOR A PNEUMATIC SCRAP CONVEYING SYSTEM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field of Disclosure

This disclosure generally relates to systems and methods for shut-off valves or shut-off gates used for power saving in material handling and pneumatic scrap conveying systems comprising of blowers, ducts, and box making or other manufacturing equipment.

Description of the Related Art

Pneumatic scrap conveying systems are air transfer systems for moving wet or dry material to a central processing system or load-out container. Typical pneumatic scrap conveying systems include blowers, ducts, cyclones, or separation devices to remove scrap waste from box making, printing and/or other manufacturing equipment. Such systems can be energy intensive to operate.

SUMMARY

The aspects of this disclosure are directed to pneumatic scrap conveying systems having a power saving shut off gate. Currently, pneumatic scrap conveying systems for box making and/or printing equipment include blowers or fans which continuously run, even when the box making and/or printing equipment manufacturing line has stopped running. It would be beneficial to reduce the amount of energy required to keep the blowers running at times to reduce costs. An aspect of the present disclosure is the recognition that starting and stopping the blowers and/or fans can cause stress on the motors, leading to premature failure and increased equipment costs. Advantageously an aspect of certain embodiments of the disclosure is the recognition that by reducing the volume of air the blower receives can lead to reducing energy, reducing costs, and reducing the wear and tear of a blower motor. Accordingly, in certain aspects, the systems disclosed herein can reduce the amount of energy required to operate a pneumatic scrap conveying system.

In some embodiments disclosed herein, a pneumatic scrap conveying system for a series of manufacturing lines can include a vacuum coupled to a scrap removal area and a duct coupled to the vacuum. The vacuum can be configured to continuously operate. The vacuum can include a fan unit coupled to a motor and the fan unit can rotate at a continuous speed. Additionally, the vacuum can be a plurality of vacuums. The duct can include a second end coupled to the vacuum and a first end coupled to an area of at least one of the series of manufacturing lines. The duct can be a plurality of ducts and each of the plurality of ducts can be coupled to a corresponding manufacturing line. The pneumatic scrap conveying system can additionally include a gate positioned adjacent to the first end of the duct configured to open and close. The vacuum can be configured to remove scrap from at least one of the series of manufacturing lines by suctioning scrap located at the first end of the duct and through the gate that can be in an open position. The scrap can be suctioned to a scrap removal area. The gate can be configured to reduce a volume of air received by the vacuum by closing the gate when at least one of the series of manufacturing lines are not operating. Closing the gate can reduce an amount of energy consumed by the vacuum.

In some embodiments disclosed herein, the gate can include a gate door. The gate door can be configured to open to suction scrap from at least one of the series of manufacturing lines and close to reduce the volume of air received by the vacuum. The volume of air received by the vacuum can be configured to reduce to nearly zero when the gate is closed. The gate can include a pneumatic cylinder mounted to the gate to open and close the gate door. The pneumatic cylinder can be configured to receive and/or exhaust a flow of air to close and/or open the gate door. The gate can be a plurality of gates.

In some embodiments, the gate door can be operated by a controller system. Additionally, the gate door can be operated by a time delayed relay that can be configured to close the gate door after a predetermined period of time to permit the suctioned scrap to reach scrap removal area. The time delayed relay can be configured to close the gate door when at least one of the series of manufacturing lines is stopped. The time delayed relay can be configured to open the gate door when at least of the series of manufacturing lines is running.

In some embodiments disclosed herein, a power saving gate system can include a gate body, a gate door coupled to the gate body, and a controller system. The gate body can have a gate outlet and a gate inlet. A diameter of the gate outlet can be approximately 1 inch in diameter larger than a diameter of the gate inlet. The controller system can be configured to open and close the gate door. Additionally, the controller system can include a time delayed relay configured to open and close the gate door after a predetermined time.

In some embodiments, the gate door can be configured to open to allow scrap to flow through the gate body. The gate door can be configured to close to reduce a volume of air that passes through the gate body. The gate body can be coupled to a duct which allows scrap travels through said duct. The duct can be coupled to a blower. The gate body can include a gate duct flange and a door guard coupled to the gate body. The blower can include a fan unit. The fan unit can rotate to draw scrap through the duct. The fan unit can continuously run at a continuous speed. In some embodiments, the volume of air passing through the gate door is reduced to nearly zero when the gate door is closed.

In some embodiments disclosed herein, a power saving gate system can include a gate door is coupled to a pneumatic cylinder. The pneumatic cylinder can be configured to open and close the gate door. The gate door can be configured to close when a manufacturing line coupled to a duct is stopped after a predetermined time. A time delayed relay can be configured to close the gate door after scrap reaches (e.g., all scrap in a duct) a scrap removal area. The time delayed relay can also be configured to energize a coil in an air directional control valve to provide compressed air to a pneumatic cylinder coupled to the gate door to close the gate door. The time delayed relay can be configured to de-energize a coil in an air directional control valve to remove compressed air from a pneumatic cylinder coupled to the gate door to open the gate door. The air directional control valve can be a spring return air directional control valve.

In some embodiments disclosed herein, a power saving gate assembly can include a gate body coupled to a gate door and a pneumatic cylinder coupled to the gate body and configured to move the gate door from an open position to a closed position. The power saving gate assembly can include a door guard configured to receive the gate door when the gate door is in the open position. The power saving gate assembly can also include a controller system which can include a time delayed relay. The time delayed relay can be configured to open and close the gate door. The gate door can be configured to open and close. The gate door can also be configured to open by linearly translating from the gate body to the door guard. Additionally, placing the gate door in a closed position can reduce a volume of air received by a scrap conveying system to reduce an amount of energy consumed by the scrap conveying system.

In some embodiments disclosed herein, a method for operating a scrap conveying system can include providing a power saving gate assembly including a gate body coupled to a gate door and a controller system configured to open and close the gate door. The method can further include positioning the power saving gate assembly on a scrap conveying system. In some embodiments, the scrap conveying system can include a vacuum, a duct, and a manufacturing line. The method can also include starting the manufacturing line of the scrap conveying system to suction scrap with the vacuum from the manufacturing line and through the duct. The method can also include opening the gate door when the manufacturing line is running to permit scrap to travel to a scrap removal area. Additionally, the method can include closing the gate door when the manufacturing line is stopped to prevent a volume of air from passing through the gate body to the vacuum to reduce an amount of energy consumed by the vacuum.

In some embodiments disclosed herein a method for operating a scrap conveying system including: operating a manufacturing line of a scrap conveying system to suction scrap with a vacuum from the manufacturing line and through a duct; during operation of the manufacturing line, placing a power saving gate assembly positioned within the duct in an open position to permit scrap to travel to a scrap removal area, the power saving gate assembly including a gate body coupled to a gate door; and closing the gate door when the manufacturing line is stopped to prevent a volume of air from passing through the gate body to the vacuum to reduce an amount of energy consumed by the vacuum. A controller system can be configured to open and close the gate door. The controller system can be connected to a time delayed relay and the time delayed relay can be configured to close the gate door after a predetermined period. The vacuum can run continuously, and the vacuum can be coupled to a fan unit which can be configured to rotate at a continuous fan speed.

BRIEF DESCRIPTION OF THE DRAWINGS

FIG. 4C illustrates a top view of the door guard of FIG. 4A.

FIG. 4D illustrates a left view of the door guard of FIG. 4A.

FIG. 4E illustrates a right view of the door guard of FIG. 4A.

FIG. 5A illustrates top view of the gate door for the shut-off gate assembly of FIG. 3A.

FIG. 5B illustrates side view of the gate door for the shut-off gate assembly of FIG. 3A.

FIG. 5C illustrates front view of the gate door for the shut-off gate assembly of FIG. 3A.

FIG. 6A illustrates a front view of the inlet portion of the gate body for the shut-off gate assembly of FIG. 3A.

FIG. 6B illustrates a left view of the inlet portion of the gate body for the shut-off gate assembly of FIG. 3A.

FIG. 6C illustrates a top view of the inlet portion of the gate body for the shut-off gate assembly of FIG. 3A.

FIG. 6D illustrates a right view of the inlet portion of the gate body for the shut-off gate assembly of FIG. 3A.

FIG. 8A illustrates a front view of the outlet portion of the gate body for the shut-off gate assembly of FIG. 3A.

FIG. 8B illustrates a side view of the outlet portion of the gate body for the shut-off gate assembly of FIG. 3A.

FIG. 8C illustrates a top view of the outlet portion of the gate body for the shut-off gate assembly of FIG. 3A.

DETAILED DESCRIPTION

Figure 1:
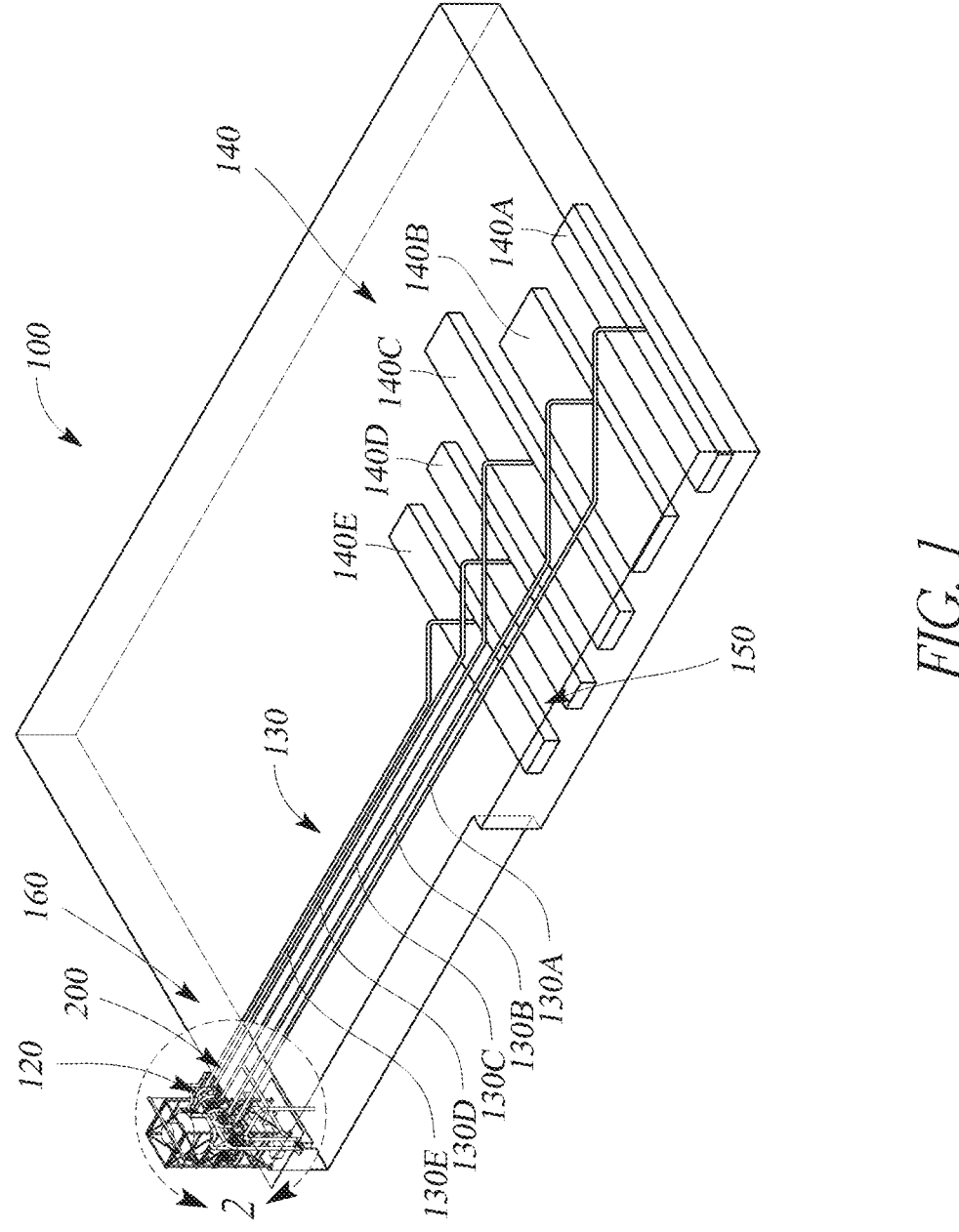
FIG. 1 illustrates a perspective view of a pneumatic scrap conveying system.

In accordance with one aspect of the disclosure, a power saving shut off gate or power saving shut off gate assembly operable on a pneumatic scrap conveying system is provided. The devices, systems, and methods described herein may disclose a scrap conveying system which can have ducts and blowers (e.g., vacuums) which can remove scrap from box making or printing equipment or other manufacturing lines. The scrap can travel from a first location (e.g., inlet) of the ducts located near or adjacent to the manufacturing line and travel through the ducts to a second area or waste area (e.g., scrap removal area). In some embodiments, the blowers (e.g., vacuums) can provide suction which can pull scrap from the manufacturing line to a waste area. The power saving shut off gate assembly can be positioned near the blower and can allow scrap to pass through an opening of the gate when the manufacturing line is operational and producing scrap. Additionally, the power saving shut off gate can close (e.g., block a flow of air and material flowing through the ducts) when the manufacturing line is non-operational (e.g., not producing scrap) to reduce the volume of air received by the blower (e.g., fan, vacuum). Advantageously, by closing the power saving shut off gate, the amount of energy used by the scrap conveying system and/or the blower can be significantly reduced due to the reduction of the overall air volume being moved and/or received by the blower.

In some embodiments, the power saving shut off gate assembly disclosed herein can have a gate body which can be designed to support a gate door. Additionally, in some embodiments, the power saving shut off gate assembly can have a door guard, which can contain and/or protect the door when the gate door is an open position (e.g., a volume of air is received by the blower, scrap can flow to the waste area). To open the gate door, a pneumatic cylinder can be mounted on the power saving shut off gate assembly and can linearly translate the door from an open position to a closed position. To open and/or close the gate door, the pneumatic cylinder can receive a flow of compressed air which can translate the gate door from an open position to a closed position or from a closed position to an open position. However, in some embodiments, the gate door can be opened and closed by a variety of liner actuators (e.g., hydraulic, servo, screw driven, etc.).

Although the devices, systems, and methods disclosed herein are discussed in relation to pneumatic scrap conveying systems, the devices, systems, and methods can also be used in other industries. For example, the power saving shut off gate assembly can be used for conveying linen commercial laundry systems. In another example, the power saving gate assembly can be used in material handling for trash sorting systems. The devices, systems, and methods disclosed herein can be further used many ducted systems that are designed to direct materials, items, or scrap from one (e.g., first) location to another (e.g., second) location.

Figure 2:
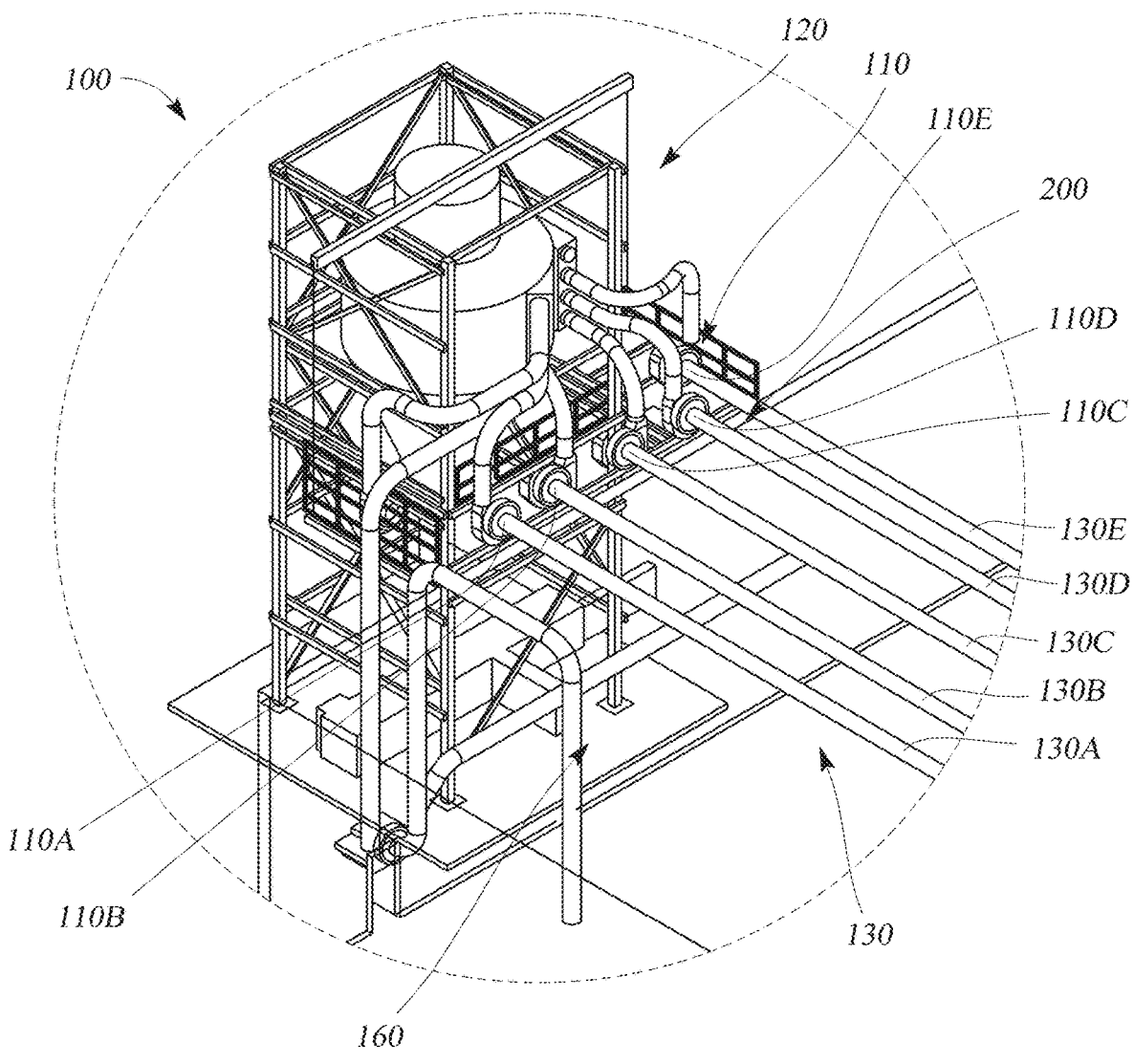
FIG. 2 illustrates a detail view of the blower area of the pneumatic scrap conveying system of FIG. 1.

FIGS. 1-2 show an example of a scrap conveying system 100 (e.g., pneumatic scrap conveying system). The scrap conveying system 100 can include a series of manufacturing lines 140 (e.g., manufacturing lines 140A, 140B, 140C, 140D, 140E), a plurality of ducts 130 (e.g., ducts 130A, 130B, 130C, 130D, 130E), and a plurality of blowers or vacuums 110 (e.g., vacuum 110A, 110B, 110C, 110D, 110E). Each of the corresponding manufacturing lines 140 can have a corresponding duct 130 and a corresponding blower 110 (e.g., manufacturing line 140A: duct 130A: blower 110A; manufacturing line 140B: duct 130B: vacuum 110B).

The series of manufacturing lines 140 can be for box-making and/or printing equipment. In some embodiments, the manufacturing lines 140 can be for any scrap making manufacturing process. For example, the manufacturing lines 140 can be for packaging, metal making, ceramics, etc. The plurality of ducts 130 (e.g., ducts 130A, 130B, 130C, 130D, 130E) can have a first end (e.g., inlet end) located at or adjacent to the manufacturing lines 140 at a position where the manufacturing lines are producing scrap (e.g., sawdust, boxes, cardboard, etc.). The plurality of ducts 130 can be approximately 200 feet long. Additionally, the plurality of ducts can be approximately between 150 feet and 250 feet long. When scrap is generated at the manufacturing lines 140, the first end (e.g., inlet end) of the plurality of ducts 130 can receive scrap when the plurality of vacuums 110 (e.g., blowers) create a suction force originating at the second end of the ducts 130 which can draw in (e.g., suction) scrap at the first end of the ducts 130. Therefore, in some embodiments, a corresponding manufacturing line 140 (e.g., manufacturing line 140A) can create scrap from box making and/or printing equipment and the scrap can travel through a corresponding duct 130 (e.g., duct 130A) to a scrap removal area 120. Advantageously, by removing scrap from the manufacturing lines 140, manufacturing can continue without significant downtime or maintenance. In some embodiments, the scrap can travel through a corresponding duct 130 at approximately 4000 feet per minute. Additionally, the scrap can travel through the corresponding duct at a speed of approximately 3000 feet per minute and 7000 feet per minute.

In some embodiments, the plurality of ducts 130 can be connected to the plurality of vacuums 110 at a second end (e.g., outlet end) of the plurality of ducts 130. The first end of the plurality of ducts 130 can be located at or adjacent to a proximal area 150 of the scrap conveying system 100. The second end of the plurality of ducts 130 can be located at a scrap removal area 120. Advantageously, each of the manufacturing lines 140 can have a corresponding vacuum 110 which can operate to remove scrap from the individual manufacturing line 140 (e.g., duct 130A can be connected to vacuum 110A). If one of the plurality of vacuums 110 malfunctions or stops operating, the other functioning plurality of vacuums 110 can still remove scrap from the corresponding manufacturing lines 140. Additionally, the scrap can pass through the plurality of vacuums 110 to reach the scrap removal area 120.

In some embodiments, the plurality of vacuums 110 can have a fan unit which can be driven by a motor or other power source. The fan unit of the plurality of vacuums 110 can spin at a continuous speed to provide a suction force capable of removing scrap from the manufacturing lines 140 by drawing the scrap through the ducts 130. Advantageously, the fan unit for the plurality of vacuums 110 can continuously run (e.g., rotate, continuously rotate at a fan speed) to prevent premature mechanical failure and/or stress on the motors due to starting/stopping the fan unit and/or vacuum 110 over a period of time. Additionally, in some embodiments the energy used by the plurality of vacuums 110 can be predetermined based on the amount of fan load that is experienced by the plurality of vacuums 110, which can be based on the amount of air moved by the fan units of the plurality of vacuums 110 through the plurality of ducts 130.

In some embodiments, a shut off gate assembly 200 (e.g., power saving shut off gate 200) can be placed on the scrap conveying system 100. The shut off gate assembly 200 (see, for example, FIG. 3A) can have a gate door 220 which can open and close (e.g., mechanically open and close). When the gate door 220 of the shut off gate assembly 200 is closed the amount and/or volume of air which received by the plurality of vacuums 110 can be reduced. In certain embodiments, closing the shut off valve gate assembly 200 or putting the assembly 200 in a closed position includes reducing the open area at the inlet of the assembly 200 by at least 90% and in certain embodiments by at least 95% in certain embodiments at least 99% and in certain embodiments 100%. In certain embodiments, closing the shut off valve gate assembly 200 or putting the assembly in a closed position includes reducing the air flow the assembly 200 (as compared to a fully open position) by at least 90% and in certain embodiments by at least 95% in certain embodiments at least 99% and in certain embodiments 100%. Advantageously, reducing the amount of air received by the plurality of vacuums 110 by closing the gate door 220 can reduce an amount of energy required to operate the plurality of vacuums 110 and the scrap conveying system 100. Since the energy necessary to power the fan unit of the plurality of vacuums 110 is based the volume of air received by the plurality of vacuums 110, substantially reducing or blocking air flow can reduce the energy necessary to operate the plurality of vacuums 110. Additionally, when the gate door 220 of the shut off gate assembly 200 is open, the plurality of vacuums 110 can draw scrap from the manufacturing lines 140 through the plurality of ducts 130.

In some embodiments, the shut off gate assembly 200 can be placed near the plurality of vacuums 110 or at a distal location 160 of the plurality of ducts 130. In some embodiments, the shut off gate assembly 200 can be placed at any location along the plurality of ducts 130. In some embodiments, the shut off gate assembly 200 can be placed near or adjacent to the proximal area 150 of the scrap conveying system 100. Advantageously, there can be more than one or a plurality of shut off gate assemblies 200 which can be disposed on each of the plurality of ducts 130 (e.g., ducts 130A, 130B, 130C, 130D, 130E each have a shut off gate assembly 200).

In some embodiments, the shut off gate assembly 200 can be designed to open and close based on whether the manufacturing lines 140 or corresponding manufacturing lines 140 (e.g., manufacturing lines 140A, 140B, 140C, 140D, 140E) are operating (e.g., producing goods/producing scrap) or down (e.g., not producing good/not producing scrap). In some embodiments, when one of the manufacturing lines 140 (e.g., manufacturing line 140A) is not running the shut off gate assembly 200 will be in a closed position which will prevent scrap air and air from travel from the manufacturing line 140A and past the corresponding vacuum 110A through the duct 130A.

In some embodiments, a controller system 280 (see, for example, FIG. 10) can be used to open and close the gate door 220. The controller system 280 can comprise of a time delayed relay 260 which can be configured to close the gate door 220 after a predetermined period of time. Closing the shut off gate assembly 200 after a predetermined period of time can allow scrap generated at the manufacturing lines 140 to pass through the plurality of ducts 130 before the gate door 220 closes. The predetermined period of time can be approximately three seconds. Additionally, in some embodiments, the predetermined period of time can be between one second and six seconds. If the predetermined period of time is not accurately determined, or if there is no delay for closing the gate door 220, scrap may obstruct the gate and cause gate malfunction. The time delayed relay 260 can be coupled to machine control panel 270 which can be located at the manufacturing lines 140.

The machine control panel 270 can be configured to permit a user or line operator to put the manufacturing line 140 in a stop mode or a run mode. Therefore, in some examples, a user or line operator can put the manufacturing line 140 in "stop" mode to prevent a volume of air from reaching the vacuums 110 when the manufacturing line 140 is stopped. Additionally, in some embodiments, a user can put the manufacturing line 140 in run mode to start the manufacturing process and permit scrap to flow through the ducts 130 and reach the scrap removal area 120. The controller system 280 may comprise a singular unit or be distributed across several devices. In certain embodiments, the controller system 280 can include a processor and a non-transitory computer-readable storage medium such as a persistent magnetic storage drive, solid state drive, etc., configured to store instructions that are executable by the processor to operate the controller system 280 according to one or more control methods. The execution of those instructions, whether the execution occurs in the processor or elsewhere, may control the entire system or sub-system(s) thereof. For example, when executed by a processor of the computer system, the instructions may cause the components of the system to operate.

Figure 3A:
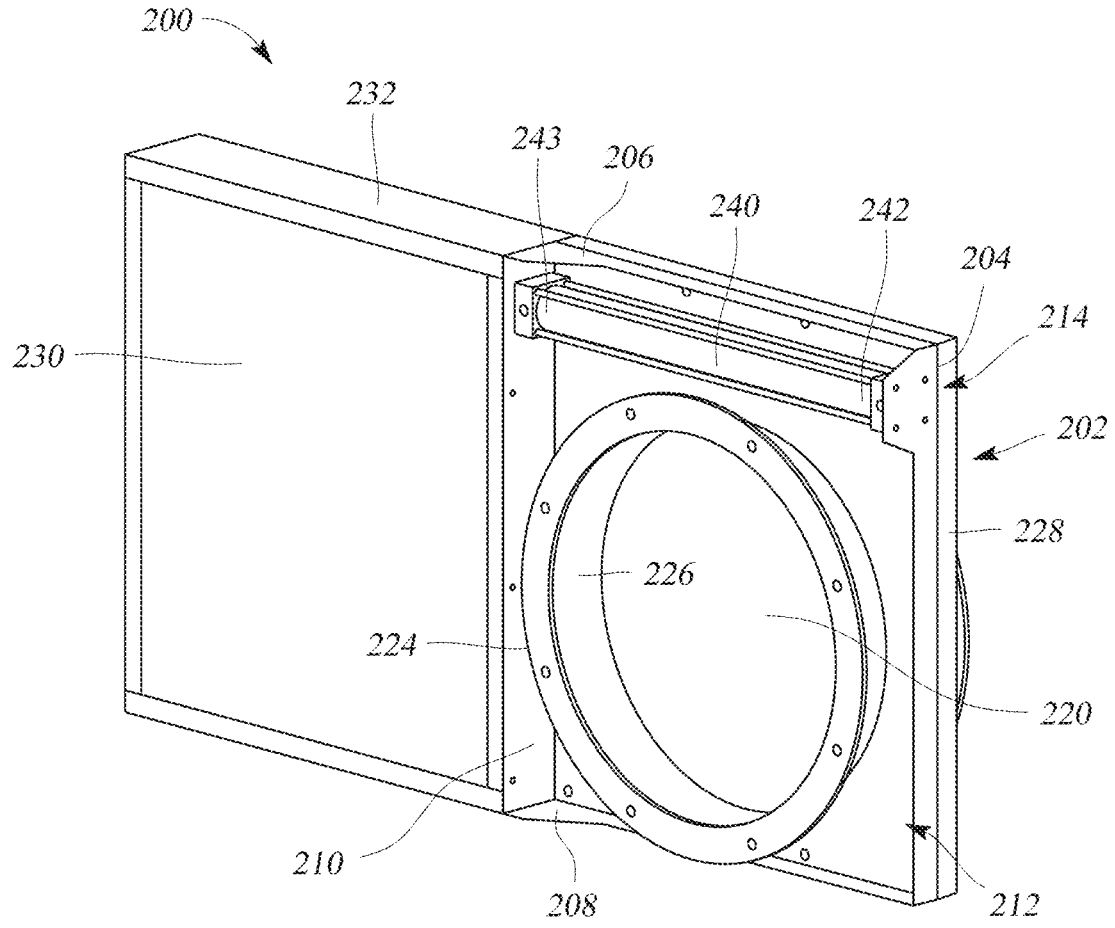
FIG. 3A illustrates a front perspective view of a shut-off gate assembly.
Figure 3B:
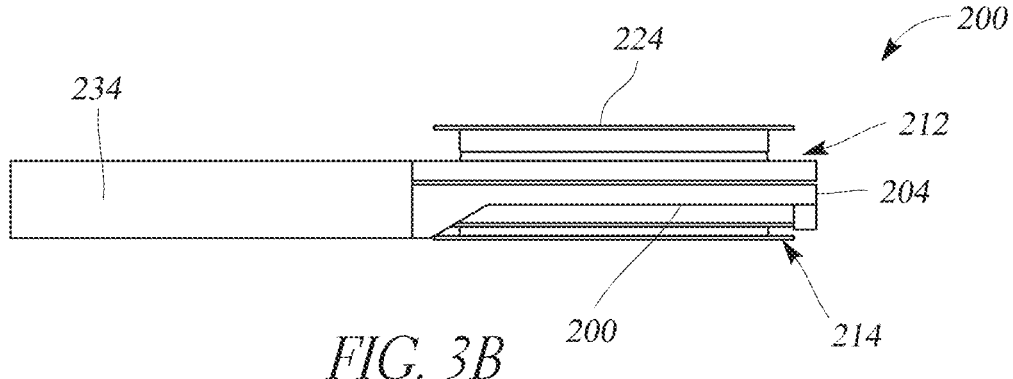
FIG. 3B illustrates a top view of the shut-off gate assembly of FIG. 3A.
Figure 3C:
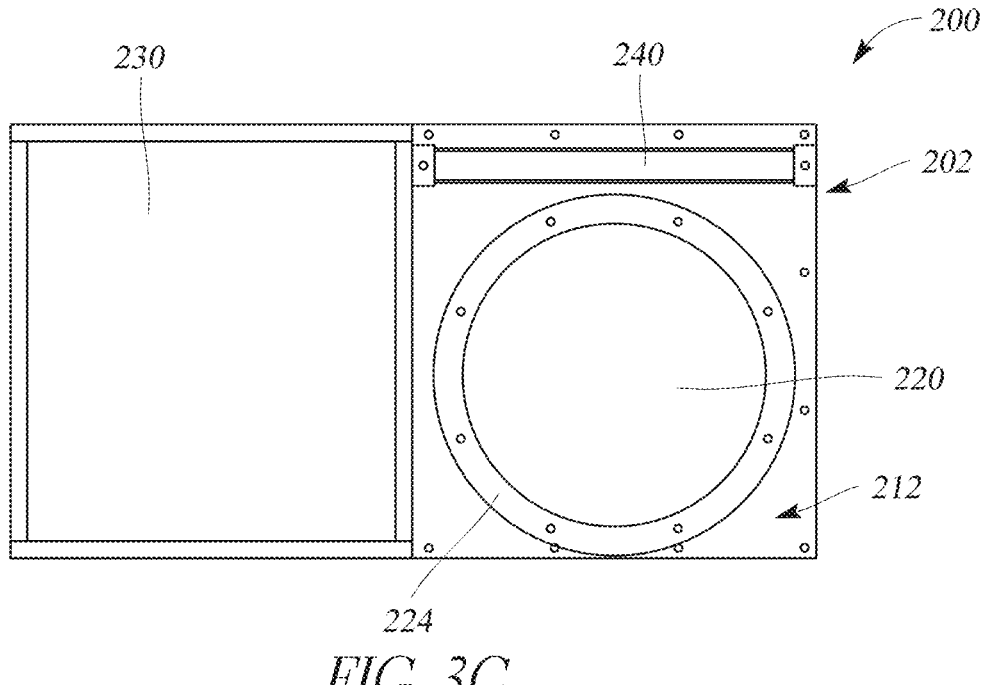
FIG. 3C illustrates a front view of the shut-off gate assembly of FIG. 3A.
Figure 4A:
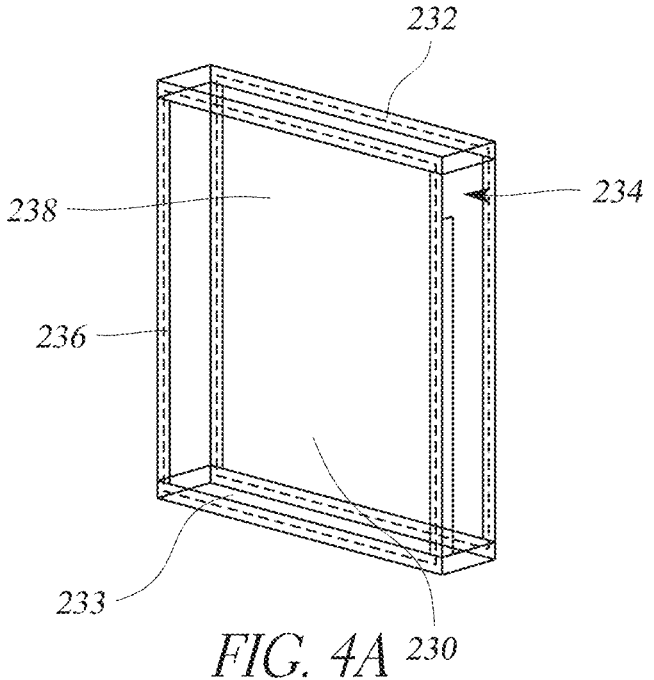
FIG. 4A illustrates a perspective view of the door guard for the shut-off gate assembly of FIG. 3A.
Figure 4B:
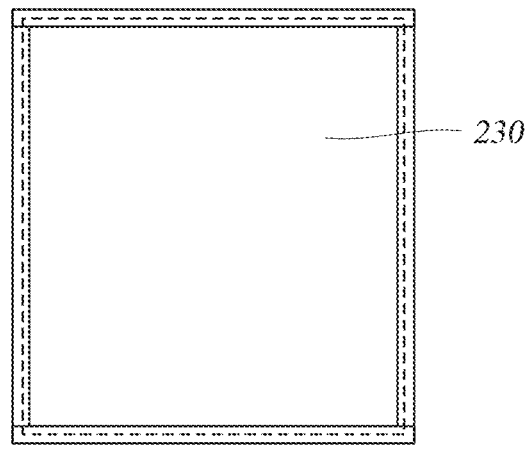
FIG. 4B illustrates a front view of the door guard of FIG. 4A.

FIGS. 3A-3C illustrate the shut off gate assembly 200 for use on the scrap conveying system 100. The shut off gate assembly 200 can include a gate body 202, a gate door 220, a flange 224, and a door guard 230. The gate body 202 can retain the gate door 220 when the shut off gate assembly 200 is in a closed position (e.g., when the at least one of the plurality of ducts 130 are not running and scrap is not being generated). The gate body 202 can have a plurality of sides, which can include a right side 204, a left side 210, a top side 206, and a bottom side 208. Additionally, in some embodiments, the gate body 202 can have an inlet side 212 and can have an outlet side 214. The gate body 202 can be oriented so that the scrap enters the inlet side 212 and exits at the outlet side 214.

The gate body 202 can also have an inlet channel 226. The inlet channel 226 can be walled and designed to couple with the outer walls of the plurality of ducts 130. In some embodiments, the diameter of the inlet channel 226 can have approximately the same diameter as the plurality of ducts 130. The inlet channel 226 can be located distal to the flange 224 and can extend from the surface of the inlet side 212. Additionally, in some embodiments, the diameter of the outlet channel 227 can be larger than the diameter of the inlet channel 226 to prevent material from catching (see, for example, FIG. 8A). An advantage of the illustrated embodiment is that it can prevent scrap from being trapped in the plurality of ducts 130 and/or at the shut off gate assembly 200. The diameter of the outlet channel 227 can be approximately one inch in diameter greater than the diameter of the of inlet channel 226. In some cases, the diameter of the outlet channel 227 can be between 0.5 inches and 3 inches larger than the inlet channel 226. In some alternative embodiments, the inlet channel 226 and the outlet channel 227 can be square or rectangular.

The shut off gate assembly 200 can also have a pneumatic cylinder 240 which can open and close the door. In some embodiments, when the pneumatic cylinder 240 receives compressed air at the second side 243, the gate door 220 will move from the open position to the closed position. In some embodiments, when the flow of compressed air delivered to the first side 242 of the pneumatic cylinder 240, the gate door 220 will open.

The shut off gate assembly 200 can have an overall length of approximately 50 inches. Additionally, the shut off gate assembly 200 can have an approximate length between 40 inches and 70 inches. In some embodiments, the shut off gate assembly 200 can have an overall height of approximately 26 inches. Additionally, in some embodiments, the shut off gate assembly 200 can have an overall height between 20 inches and 30 inches. The shut off gate assembly 200 can have a thickness of approximately 6 inches. Additionally, in some embodiments, the shut off gate assembly 200 can have an overall thickness of approximately 4 inches to 8 inches.

FIGS. 4A-4E show the door guard 230 for the shut off gate assembly 200. The door guard 230 can be designed to retain the gate door 220 when the shut off gate assembly 200 is in an open position (e.g., when at least one of the plurality of ducts 130 is running and scrap is being generated and traveling through the ducts). The door guard 230 can, in some embodiments, be cage-like. The door guard 230 can have a top side 232, left side 236, a bottom side 233, and a back side 238 to retain the door guard 230. In some embodiments, the door guard 230 can have a left side opening 234. The left side opening 234 can be positioned between the back side 238 and a partial wall 235. The left side opening 234 can be sized and/or configured to allow the gate door 220 to pass through from the gate body 202 to be contained in the door guard 230. In some embodiments, the pneumatic cylinder 240 can be configured to open the shut off gate assembly 200 by linearly translating the gate door 220 from the gate body 202 to the door guard 230. The door guard 230 can have an overall length of approximately 24 inches. Additionally, the 230 can have an overall length between 20 inches and 30 inches.

FIGS. 5A-5C illustrate the gate door 220. The gate door 220 can be rectangularly shaped. Alternatively, in some embodiments, the gate door 220 can be square or circular. Additionally, in some implementations the gate door 220 can have an opening 221 which can receive a rod or a connector. The rod can be connected to an actuator (e.g., pneumatic cylinder 240) which can be configured to open and close the gate door 220. In some embodiments, the actuator can be an electric linear actuator, an electric rotational actuator, a pneumatic rotational actuator, or any actuator capable of moving the gate door 220 from an open position to a closed position. Additionally, the gate door 220 can be designed such that no debris can pass through the gate door 220 and reach the scrap removal area 120. The gate door 220 can also be designed to minimize the amount of air that can pass through the plurality of ducts 130 and reach the plurality of vacuums 110. Therefore, the gate door 220 can reduce a volume of air received by the plurality of vacuums 110 to nearly zero. An advantage of the current embodiment is that by reducing the volume of air received by the plurality of vacuums 110 to nearly zero, the energy used by the plurality of vacuums 110 and the scrap conveying system 100 can be reduced (e.g., minimized). Additionally, in some embodiments, the gate door 220 can be configured to reduce the amount of air received by the plurality of vacuums 110 to be less than 10% of the maximum possible air volume, in certain embodiments, less than 5% of the maximum possible air volume, in certain embodiments less than 1% and in certain embodiments 0%. In some embodiments, the volume of air received by the plurality of vacuums 110 when the gate door 220 is closed can be between 0%-50% of the maximum possible air volume the plurality of vacuums 110 can receive when the gate door 220 is open. By configuring the gate door 220 to close to prevent a volume of air from reaching the plurality of vacuums 110 (e.g., essentially no air reaches the plurality of vacuums 110), a power savings or energy usage of approximately 50% can be achieved.

The gate door 220 can have an overall height of approximately 24 inches. In some embodiments, the gate door 220 can have a height between 20 inches and 30 inches. Additionally, the gate door 220 can have a length of approximately 24 inches. In some embodiments, the gate door 220 can have a length between approximately 20 inches and 30 inches. The gate door 220 can have a thickness of approximately 2 inches. Additionally, in some embodiments, the gate door 220 can have a thickness between 1.5 inches and 4 inches.

Figure 7:
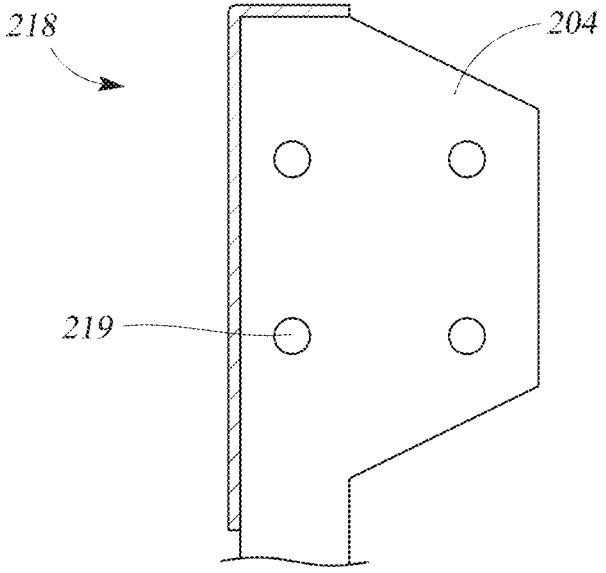
FIG. 7 illustrates a detail view of right-side of the inlet portion of the gate body.

FIGS. 6A-7 illustrate the inlet side 212 of the gate body 202. The inlet side 212 can have a right side 204, a left side 210, and a top side 206. The left side can have an opening 216. The opening 216 can be used to allow the pneumatic cylinder 240 move (e.g., translate) the gate door 220 between the open position and the closed position. Additionally, the right side 204 of the inlet side 212 can have a coupling area 218. The coupling area 218 can permit the pneumatic cylinder 240 to mount to the shut off gate assembly 200 so that the gate door 220 can move from the open position to the closed position. The coupling area 218 can have a plurality of holes 219 (e.g., through holes) which can be used to mount the pneumatic cylinder 240 to mount to the gate body 202. Although not shown, in some embodiments, the gate door 220 can be configured to rotate about a shaft from an open position (e.g., a volume of air flows to the plurality of vacuums 110) to a closed position (e.g., reducing the amount of air received by the plurality of vacuums 110 to be less than 1 the maximum possible air volume). The gate door 220 can rotate from a closed position, where the gate door 220 is in a horizontal position, to an open position, where the gate door 220 is in a vertical position.

FIGS. 8A-8C illustrate the outlet side 214 of the gate body 202. The outlet side 214 can have a side wall 228 and a top edge 229. The outlet side 214 can mount to the inlet side 212 by a series of fasteners. The inlet side 212 can have a plurality of apertures 221 which can allow the fasteners to connect the inlet side 212 to the outlet side 214. The outlet side 214 can have an outlet channel 227 which can have approximately the same inner diameter as the outer diameter of the plurality of ducts 130. In some embodiments, the diameter of the outlet channel 227 can be approximately 1 inch larger than the diameter of inlet channel 226.

Figure 9A:
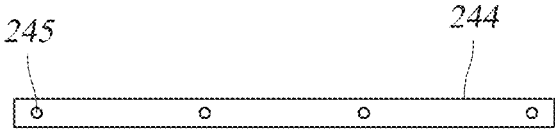
FIG. 9A illustrates a top view of a long side spacer for the shut-off gate assembly of FIG. 3A.
Figure 9B:
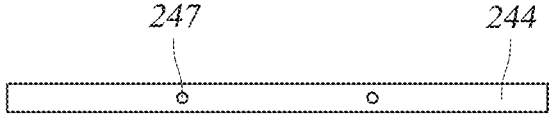
FIG. 9B illustrates a top view of a short side spacer for the shut-off gate assembly of FIG. 3A.

FIGS. 9A-9B illustrate a spacer 244 for the gate body the gate body 202. The spacer can have a first set of holes 245 and a second set of holes 247 which can be used to couple to the shut off gate assembly 200. The spacer 244 can be configured to provide a gap (e.g., space) between the inlet side 212 and the outlet side 214 of the gate body 202. Advantageously, creating a space between the outlet side 214 and the inlet side 212 can allow the gate door 220 to freely travel within the space so that the gate door 220 can open and close.

Figure 10:
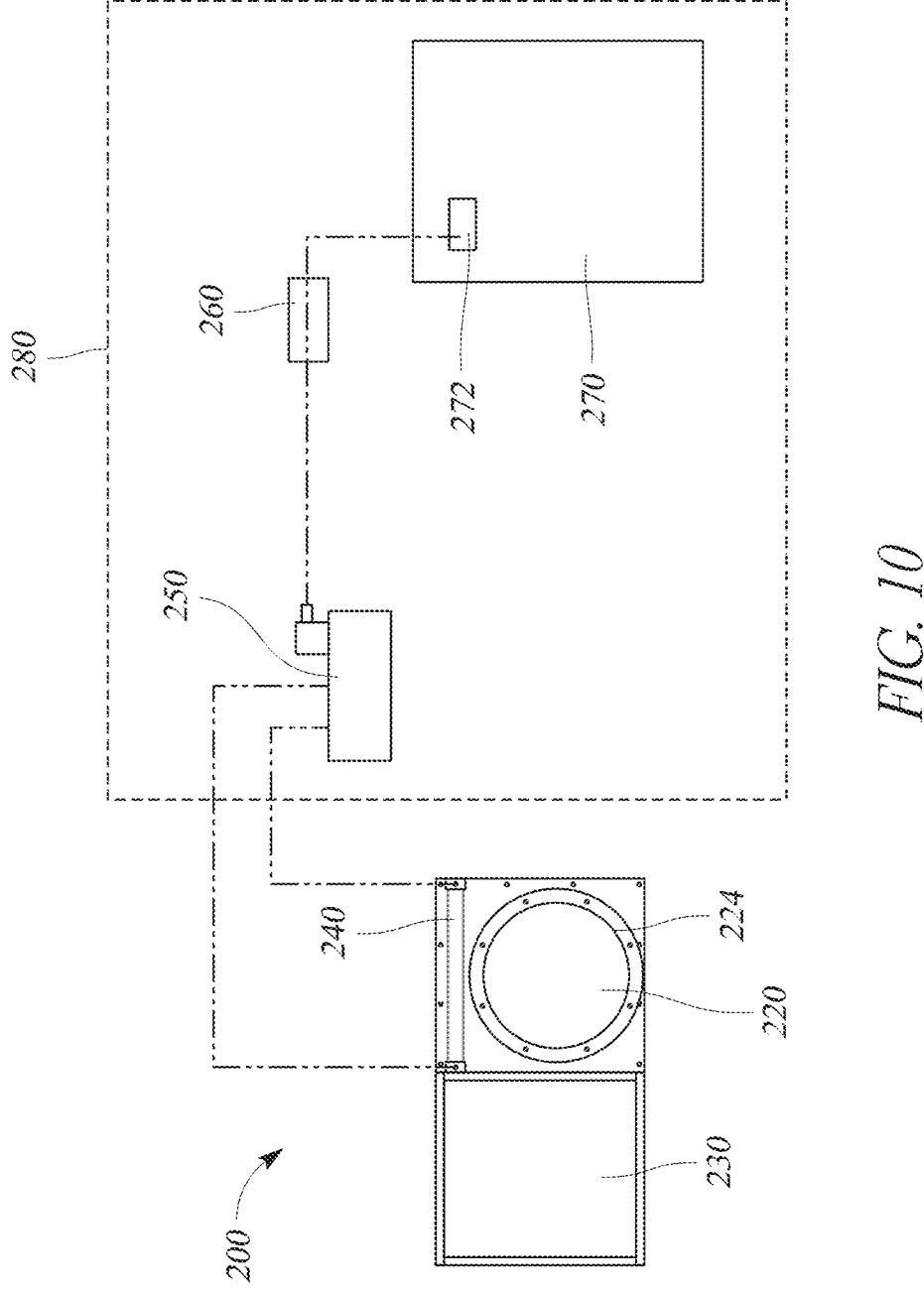
FIG. 10 illustrates a schematic view of the controller system of the shut-off gate assembly.

FIG. 10 illustrates a schematic view of the controller system 280 of the shut-off gate assembly 200. The shut off gate assembly 200 can be controlled by a machine control panel 270. The machine control panel 270 can coupled to a time delayed relay 260 and a run signal relay 272. In some embodiments, the time delayed relay 260 can be configured to close the gate door 220 after a predetermined period of time (e.g., 5 seconds, 10 seconds, 1 minute, etc.) to permit the suctioned scrap to reach scrap removal area 120. Additionally, in some embodiments, the machine control panel 270 and the time delayed relay 260 can be configured to close the gate door 220 when the manufacturing line 140 (e.g., manufacturing line 140A) is stopped and open the gate door 220 when the manufacturing line 140 (e.g., manufacturing line 140A) is running.

In some embodiments, the air directional control valve 250 (e.g., spring return air directional control valve) can be configured to receive a voltage which can energize a coil in the air directional control valve 250 to provide compressed air to a second side 243 of the pneumatic cylinder 240. In some embodiments, energizing the coil of the air directional control valve 250 can close the gate door 220. Additionally, the coil can be energized and compressed air can be delivered to the second side 243 of the pneumatic cylinder 240 when the manufacturing line 140 is stopped. Additionally, in some embodiments, the coil of the air directional control valve 250 can be de-energized (e.g., lose a voltage) which can return the coil to its original position when the manufacturing line 140 is running. When the coil of the air directional control valve 250 is de-energized, compressed air can be delivered to a first side 242 of the pneumatic cylinder 240 which can open the gate door 220. In some embodiments, the amount of compressed air delivered to the pneumatic cylinder 240 can be approximately between 70 psi and 120 psi. The amount of voltage delivered to the air directional control valve 250 to energize/de-energize the coil of the air directional control valve 250 can be either 24 V or 120 V.

In some embodiments, the controller system 280 and or processor can include the air directional control valve 250, the time delayed relay 260, the machine control panel 270, and a run signal relay 272. The machine control panel 270 can have user inputs which can control various aspects of the system. For example, the machine control panel 270 may have one or more buttons which can be used to start or stop the manufacturing lines 140.

The controller system 280 can be used to perform certain functions on the scrap conveying system 100. For example, the controller system 280 may include a processor and/or a non-transitory computer-readable storage medium configured to store programmed instructions which can start and stop the manufacturing lines 140. When the programmed instructions indicate that the manufacturing lines 140 have started (e.g., after a user selects a start option on the machine control panel 270), a signal can be sent the run signal relay 272 can de-energize a coil of the air directional control valve 250. The air directional control valve 250 can be configured to open the gate door 220.

The controller system 280 can also include programming instructions which indicate the manufacturing lines 140 have stopped. When the programming instructions indicate that the manufacturing lines 140 have stopped (e.g., after a user has selected a stop option on the machine control panel 270), the run signal relay 272 can energize (e.g., send a signal to) the time delayed relay 260. After a predetermined period of time, the time delayed relay 260 can be configured to send a signal or energize a coil of the air directional control valve 250. The air directional control valve 250 can be configured to close the air directional control valve 250 after the predetermined period of time.

In some embodiments, a method is disclosed herein directed to operating the scrap conveying system 100 to reduce an amount of energy necessary for operating the system. In some embodiments, the method can include positioning the gate door 220 on distal location 160 the plurality of ducts 130 of a scrap conveying system 100. The first end of the plurality of ducts 130 can be coupled to a continuously running vacuum or plurality of vacuums 110. Furthermore, the method can involve starting at least one of manufacturing lines 140. While operational, at least one of the continuously running plurality of vacuums 110 can suction scrap with the scrap conveying system 100 at a second end of the plurality of ducts 130 to the first end of plurality of ducts 130. While the manufacturing lines 140 are running, the gate door 220 can remain open to permit scrap to travel to a scrap removal area 120. Therefore, in some embodiments, the plurality of vacuums 110 can receive a volume of air. Additionally, in some embodiments, the gate door 220 can close when the manufacturing line is stopped which prevent a volume of air from passing through the gate body to the continuously running plurality of vacuums 110. The amount of air received at the plurality of vacuums 110 can be nearly zero. In some embodiments, reducing the amount of air received by the plurality of vacuums 110 can reduce the amount of energy consumed by the continuously running plurality of vacuums 110.

In some embodiments, a method can include stopping the manufacturing lines 140 by selecting a "stop" option or "stop" mode on the machine control panel 270. Selecting the stop mode can stop the manufacturing lines 140. Additionally, in some embodiments, selecting the "stop" mode can energize a coil in an air directional control valve 250 which can cause a flow of compressed air to be delivered to a first side 242 of the pneumatic cylinder 240. Delivering the flow of compressed air to the pneumatic cylinder 240 can cause the gate door 220 to close. In some embodiments, the machine control panel 270 can be coupled to a time delayed relay 260. Therefore, selecting the "stop" option can cause a predetermined delay (e.g., 15 second delay) between the time the "stop" option was selected and the time the gate door 220 closes. Therefore, the scrap generated at the manufacturing lines 140 can flow through the plurality of ducts 130 and reach the scrap removal area 120 before the gate door 220 closes.

In some embodiments, a method can include starting the manufacturing lines 140 by selecting a "run" option on the machine control panel 270. Selecting the "run" option can start the manufacturing lines 140. Selecting the "run" option can de-energize a coil of the air directional control valve 250 and can cause a flow of compressed air to be delivered to a second side 243 of the pneumatic cylinder 240 which can cause the gate door 220 to open.

The various illustrative logical blocks and modules described in connection with the examples disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The blocks, operations, or steps of a method, process, or algorithm described in connection with the examples disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, an optical disc (e.g., CD-ROM or DVD), or any other form of volatile or non-volatile computer-readable storage medium known in the art. A storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

ADDITIONAL EMBODIMENTS

In embodiments of the present invention, a pneumatic scrap conveying system may be in accordance with any of the following clauses:

Clause 1. A pneumatic scrap conveying system for a series of manufacturing lines, comprising: a vacuum coupled to a scrap removal area, a duct coupled to the vacuum, the duct comprising: a second end coupled to the vacuum; a first end coupled to an area of at least one of the series of manufacturing lines; and a gate positioned adjacent to the first end of the duct configured to open and close; wherein the vacuum is configured to remove scrap from at least one of the series of manufacturing lines by suctioning scrap located at the first end of the duct and through the gate in an open position to the scrap removal area; wherein the gate is configured to reduce a volume of air received by the vacuum by closing the gate when at least one of the series of manufacturing lines are not operating; wherein closing the gate reduces an amount of energy consumed by the vacuum.

Clause 2. The pneumatic scrap conveying system of clause 1, wherein the vacuum is configured to continuously operate.

Clause 3. The pneumatic scrap conveying system of clause 1, wherein the volume of air received by the vacuum is configured to reduce to nearly zero when the gate is closed.

Clause 4. The pneumatic scrap conveying system of clause 1, wherein the vacuum comprises a fan unit coupled to a motor, wherein the fan unit rotates at a continuous speed.

Clause 5. The pneumatic scrap conveying system of clause 1, wherein the gate comprises a gate door, wherein the gate door is configured to open to suction scrap from at least one of the series of manufacturing lines and close to reduce the volume of air received by the vacuum.

Clause 6. The pneumatic scrap conveying system of clause 5, wherein the gate comprises a pneumatic cylinder mounted to the gate to open and close the gate door.

Clause 7. The pneumatic scrap conveying system of clause 6, wherein the pneumatic cylinder is configured to receive a flow of air to close the gate door.

Clause 8. The pneumatic scrap conveying system of clause 6, wherein the pneumatic cylinder is configured to exhaust a flow of air to open the gate door.

Clause 9. The pneumatic scrap conveying system of clause 5, wherein the gate door is operated by a controller system.

Clause 10. The pneumatic scrap conveying system of clause 9, wherein the gate door is operated by a time delayed relay.

Clause 11. The pneumatic scrap conveying system of clause 10, wherein the time delayed relay is configured to close the gate door after a predetermined period of time to permit the suctioned scrap to reach scrap removal area.

Clause 12. The pneumatic scrap conveying system of clause 10, wherein the time delayed relay is configured to close the gate door when at least one of the series of manufacturing lines is stopped.

Clause 13. The pneumatic scrap conveying system of clause 10, wherein the time delayed relay is configured to open the gate door when at least of the series of manufacturing lines is running.

Clause 14. The pneumatic scrap conveying system of clause 1, wherein the vacuum is a plurality of vacuums.

Clause 15. The pneumatic scrap conveying system of clause 1, wherein the gate is a plurality of gates.

Clause 16. The pneumatic scrap conveying system of clause 1, wherein the duct is a plurality of ducts, wherein each of the plurality of ducts is coupled to a corresponding manufacturing line.

Clause 17. A power saving gate system, comprising: a gate body; a gate door coupled to the gate body; and a controller system configured to open and close the gate door, wherein the controller system includes a time delayed relay configured to open and close the gate door after a predetermined time; wherein the gate door is configured to open to allow scrap to flow through the gate body; wherein the gate door is configured to close to reduce a volume of air that passes through the gate body.

Clause 18. The power saving gate system of clause 17, wherein the gate body is coupled to a duct, wherein scrap travels through the duct.

Clause 19. The power saving gate system of clause 18, wherein the duct is coupled to a blower.

Clause 20. The power saving gate system of clause 19, wherein the blower comprises a fan unit.

Clause 21. The power saving gate system of clause 20, wherein the fan unit rotates to draw scrap through the duct.

Clause 22. The power saving gate system of clause 21, wherein the fan unit is continuously running.

Clause 23. The power saving gate system of clause 22, wherein the fan unit rotates at a continuous speed.

Clause 24. The power saving gate system of clause 17, wherein the volume of air passing through the gate door is reduced to nearly zero when the gate door is closed.

Clause 25. The power saving gate system of clause 17, wherein the gate door is coupled to a pneumatic cylinder, the pneumatic cylinder is configured to open and close the gate door.

Clause 26. The power saving gate system of clause 17, wherein the gate door is configured to close when a manufacturing line coupled to a duct is stopped.

Clause 27. The power saving gate system of clause 26, wherein the gate door is configured to close when the manufacturing line is stopped after a predetermined time.

Clause 28. The power saving gate system of clause 24, wherein the time delayed relay is configured to close the gate door after scrap reaches a scrap removal area.

Clause 29. The power saving gate system of clause 17, wherein the time delayed relay is configured to energize a coil in an air directional control valve to provide compressed air to a pneumatic cylinder coupled to the gate door to close the gate door.

Clause 30. The power saving gate system of clause 26, wherein the gate door is configured to open when the manufacturing line is running.

Clause 31. The power saving gate system of clause 17, wherein the time delayed relay is configured to de-energize a coil in an air directional control valve to remove compressed air from a pneumatic cylinder coupled to the gate door to open the gate door.

Clause 32. The power saving gate system of clause 17, wherein the gate body has a gate outlet and a gate inlet, wherein a diameter of the gate outlet is approximately 1 inch in diameter larger than a diameter of the gate inlet.

Clause 33. The power saving gate system of clause 17 further comprising a gate duct flange coupled to the gate body.

Clause 34. The power saving gate system of clause 17, further comprising a door guard coupled to the gate body.

Clause 35. The power saving gate system of clause 29, wherein the air directional control valve is a spring return air directional control valve.

Clause 36. A power saving gate assembly, comprising: a gate body coupled to a gate door; a pneumatic cylinder coupled to the gate body and configured to move the gate door from an open position to a closed position; a door guard configured to receive the gate door when the gate door is in the open position; and a controller system comprising a time delayed relay, wherein the time delayed relay is configured to open and close the gate door; wherein the gate door is configured to open and close; wherein the gate door is configured to open by linearly translating from the gate body to the door guard; wherein placing the gate door in a closed position reduces a volume of air received by a scrap conveying system to reduce an amount of energy consumed by the scrap conveying system.

Clause 37. A method for operating a scrap conveying system comprising: providing a power saving gate assembly comprising a gate body coupled to a gate door, and a controller system configured to open and close the gate door; positioning the power saving gate assembly on a scrap conveying system, the scrap conveying system comprising a vacuum, a duct, and a manufacturing line, starting the manufacturing line of the scrap conveying system to suction scrap with the vacuum from the manufacturing line and through the duct; opening the gate door when the manufacturing line is running to permit scrap to travel to a scrap removal area; closing the gate door when the manufacturing line is stopped to prevent a volume of air from passing through the gate body to the vacuum to reduce an amount of energy consumed by the vacuum.

Clause 38. A method for operating a scrap conveying system comprising: operating a manufacturing line of a scrap conveying system to suction scrap with a vacuum from the manufacturing line and through a duct; during operation of the manufacturing line, placing a power saving gate assembly positioned within the duct in an open position to permit scrap to travel to a scrap removal area, the power saving gate assembly comprising a gate body coupled to a gate door; and closing the gate door when the manufacturing line is stopped to prevent a volume of air from passing through the gate body to the vacuum to reduce an amount of energy consumed by the vacuum.

Clause 39. The method of clause 38, further comprising a controller system configured to open and close the gate door.

Clause 40. The method of clause 39, wherein the controller system is connected to a time delayed relay, wherein the time delayed relay is configured to close the gate door after a predetermined period of time.

Clause 41. The method of clause 38, wherein the vacuum runs continuously.

Clause 42. The method of clause 41, wherein the vacuum is coupled to a fan unit, wherein the fan unit is configured to rotate at a continuous fan speed.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include these features, elements and/or states.

The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±5%, ±10%, ±15%, etc.). For example, "about 1 mm" includes "1 mm." Phrases preceded by a term such as "substantially" include the recited phrase and should be interpreted based on the circumstances (e.g., as much as reasonably possible under the circumstances). For example, "substantially parallel" includes "parallel." Unless stated otherwise, all measurements are at standard conditions including temperature and pressure. The phrase "at least one of" is intended to require at least one item from the subsequent listing, not one type of each item in the subsequent listing. For example, "at least one of A, B, and C" can include A, B, C, A and B, A and C, B and C, or A, B, and C.

While the above detailed description may have shown, described, and pointed out novel features as applied to various embodiments, it may be understood that various omissions, substitutions, and/or changes in the form and details of any particular embodiment may be made without departing from the spirit of the disclosure. As may be recognized, certain embodiments may be embodied within a form that does not provide all of the features and benefits set forth herein, as some features may be used or practiced separately from others.

The methods which are described and illustrated herein are not limited to the sequence of acts described, nor are they necessarily limited to the practice of all of the acts set forth. Other sequences of acts, or less than all of the acts, or simultaneous occurrence of the acts, may be utilized in practicing embodiments of the embodiment(s).

It is to be understood that any range of values disclosed, taught, or suggested herein comprises all values and sub-ranges therebetween. For example, a range from 5 to 10 will comprise all numerical values between 5 and 10 and all sub-ranges between 5 and 10.

From the foregoing description, it will be appreciated that a novel approach for reducing energy in a scrap conveying system has been disclosed. While the components, techniques, and aspects of embodiments of the disclosure have been described with a certain degree of particularity, it is manifest that many changes may be made in the specific designs, constructions, and methodology herein above described without departing from the spirit and scope of this disclosure.

While a number of preferred embodiments of the disclosure and variations thereof have been described in detail, other modifications and methods for the same will be apparent to those of skill in the art. Accordingly, it should be understood that various applications, modifications, and substitutions may be made of equivalents without departing from the spirit of embodiments of the disclosure or the scope of the claims.

Various modifications and applications of the embodiments of the disclosure may occur to those who are skilled in the art, without departing from the true spirit or scope of the embodiments of the disclosure. It should be understood that the disclosure is not limited to the embodiments set forth herein for purposes of exemplification but is to be defined only by a fair reading of the appended claims, including the full range of equivalency to which each element thereof is entitled.

What is claimed is:

1. A pneumatic scrap conveying system for a series of manufacturing lines, comprising:
    a vacuum coupled to a scrap removal area, the vacuum comprising a fan unit configured to rotate at a continuous speed and coupled to a motor;
    a duct coupled to the vacuum, the duct comprising:
        a second end coupled to the vacuum; and
        a first end coupled to an area of at least one of the series of manufacturing lines;
    a gate positioned adjacent to the first end of the duct configured to open and close; and
    a controller system configured to operate the gate, the controller system comprising:

a time delayed relay configured to close the gate after a predetermined period of time, the time delayed relay configured to open the gate when at least one of the series of manufacturing lines is running, wherein the vacuum is configured to remove scrap from at least one of the series of manufacturing lines by suctioning scrap located at the first end of the duct and through the gate in an open position to the scrap removal area, wherein the predetermined period of time before the gate closes allows suctioned scrap to travel from the first end of the duct to the scrap removal area, wherein the gate is configured to reduce a volume of air received by the vacuum by closing the gate when at least one of the series of manufacturing lines are not operating, wherein the volume of air received by the vacuum is configured to reduce to nearly zero when the gate is closed, wherein closing the gate reduces an amount of energy consumed by the vacuum, wherein the gate comprises a gate door, wherein the gate door is configured to open to suction scrap from at least one of the series of manufacturing lines and close to reduce the volume of air received by the vacuum, and wherein the gate door is operated by the time delayed relay, and wherein the time delayed relay is configured to close the gate door after a predetermined period of time to permit the suctioned scrap to reach the scrap removal area.

2. The pneumatic scrap conveying system of claim 1, wherein the vacuum is configured to continuously operate.

3. The pneumatic scrap conveying system of claim 1, wherein the gate comprises a pneumatic cylinder mounted to the gate to open and close the gate door, the pneumatic cylinder is configured to receive a flow of air to close the gate door and is configured to exhaust a flow of air to open the gate door.

4. The pneumatic scrap conveying system of claim 3, wherein the time delayed relay is configured to de-energize a coil in an air directional control valve to remove compressed air from the pneumatic cylinder coupled to the gate door to open the gate door.

5. The pneumatic scrap conveying system of claim 1, wherein the time delayed relay is configured to close the gate door when at least one of the series of manufacturing lines is stopped, and wherein the time delayed relay is configured to open the gate door when at least of the series of manufacturing lines is running.

6. The pneumatic scrap conveying system of claim 1, wherein the vacuum is a plurality of vacuums, wherein the gate is a plurality of gates, and wherein the duct is a plurality of ducts, wherein each of the plurality of ducts is coupled to a corresponding manufacturing line.

7. A power saving gate system, comprising:
a gate body;
a gate door coupled to the gate body;
a controller system configured to open and close the gate door, wherein the controller system includes a time delayed relay configured to open the gate door and close the gate door after a predetermined time, the time delayed relay is configured to close the gate door after scrap reaches a scrap removal area;
a pneumatic cylinder coupled to the gate body, wherein the controller system is configured to deliver a signal to the pneumatic cylinder to move the gate door from an open position to a closed position; and a door guard configured to receive the gate door when the gate door is in the open position, wherein the gate door is configured to open to allow scrap to flow through the gate body in the open position, wherein the gate door is configured to close to reduce a volume of air that passes through the gate body, the volume of air passing through the gate door is reduced to nearly zero when the gate door is closed, wherein the gate door is configured to open by linearly translating from the gate body to the door guard, and wherein the gate body has a gate outlet and a gate inlet, wherein a diameter of the gate outlet is approximately 1 inch in diameter larger than a diameter of the gate inlet.

8. The power saving gate system of claim 7, wherein the gate body is coupled to a duct, wherein scrap travels through the duct.

9. The power saving gate system of claim 8, wherein the duct is coupled to a blower comprising a fan unit, the fan unit is configured to rotate to draw scrap through the duct.

10. The power saving gate system of claim 9, wherein the fan unit is continuously running and rotates at a continuous speed.

11. The power saving gate system of claim 7, wherein the gate door is configured to close when a manufacturing line coupled to a duct is stopped, wherein the gate door is configured to open when the manufacturing line is running, wherein the gate door is configured to close when the manufacturing line is stopped after the predetermined time.

12. The power saving gate system of claim 7, wherein the time delayed relay is configured to energize a coil in an air directional control valve to provide compressed air to the pneumatic cylinder coupled to the gate door to close the gate door, wherein the time delayed relay is configured to de-energize the coil in the air directional control valve to remove compressed air from the pneumatic cylinder coupled to the gate door to open the gate door, wherein the air directional control valve is a spring return air directional control valve.

13. The power saving gate system of claim 7 further comprising a gate duct flange coupled to the gate body.

14. A method for operating a scrap conveying system comprising:
operating a manufacturing line of a scrap conveying system to suction scrap with a vacuum from the manufacturing line and through a duct;
during operation of the manufacturing line, positioning a power saving gate assembly positioned within the duct in an open position to permit scrap to travel to a scrap removal area, the power saving gate assembly comprising a gate body coupled to a gate door and a controller system connected to a time delayed relay and configured to open and close the gate door; and
closing the gate door when the manufacturing line is stopped to prevent a volume of air from passing through the gate body to the vacuum to reduce an amount of energy consumed by the vacuum.

15. The method of claim 14, wherein the time delayed relay is configured to close the gate door after a predetermined period of time.

16. The method of claim 15, wherein the vacuum runs continuously.

17. The method of claim 16, wherein the vacuum is coupled to a fan unit, wherein the fan unit is configured to rotate at a continuous fan speed.

* * * * *